Patented July 4, 1939

2,164,362

UNITED STATES PATENT OFFICE 2,164,362

FREEZING FOODS

Robert B. Taylor, near Knoxville, Tenn.

No Drawing. Application July 7, 1938,
Serial No. 217,971

14 Claims. (Cl. 99—193)

(Granted under the act of March 3, 1883, as amended April 30, 1928; 370 O. G. 757)

The invention herein described may be manufactured and used by or for the Government for governmental purposes without the payment to me of any royalty thereon.

This invention relates to a process for the freezing and preserving of foods and is particularly directed to a new method for the rapid freezing of foods at temperatures higher than their optimum storage temperature.

A principal object of the invention is to provide a method for the freezing of foods for preservation with a minimum amount of deterioration.

A further object of the invention is the provision of a method for the rapid freezing of foods at a relatively high temperature.

Broadly, the invention comprises freezing foods, including fruits, vegetables and meats, by subjecting the foods to direct contact with a liquid refrigerant maintained at a temperature substantially below the freezing point of the food and above its optimum temperature of storage while circulating the solution over the food at such a rate that the temperature of the liquid adjacent the food remains below the freezing point of the food.

It has been found that, in general, a temperature of 0° F. is the most satisfactory temperature for the storage of frozen foods, as lower temperatures tend to have a deleterious effect on the cells of the food, while at higher temperatures degenerative changes due to oxygen and moisture, and particularly to enzyme activity, are not sufficiently avoided.

It has been found that the subjection of foods to temperatures below 0° F. even for short periods of time appears to have a destructive effect on the tissues and for this reason, in the method of the invention, the food is not subjected at any time to temperatures below its safe storage temperature, and more particularly, not substantially below 0° F.

There is a definite temperature, apparently dependent in large part on the composition of food juices, above which any particular food will not freeze. This temperature for strawberries, for example, is about 13° F. and may be called the freezing point of the food. The freezing point of various foods, such as fruit, vegetables and meats, varies to some extent, but in general, foods rapidly freeze at temperatures of 10° F. or below.

The invention, therefore, contemplates the freezing of foods at temperatures between 0° and 10° F. It has been found that at these temperatures the foods become completely frozen very rapidly if they are subjected to direct contact with a liquid refrigerant which is circulated at such a rate that the temperature adjacent the food being frozen is maintained substantially below the freezing point of the food. In general, the time for complete freezing in the process of the invention will be from two to ten minutes depending on the character of the food, the size of the units or portions and the temperature of the refrigerant liquid.

The term "completely frozen" is intended to denote that the food is frozen throughout, this does not mean that all the solutions contained in food and the water of constitution of the protoplasm are frozen, since it has been found that such components of the food may not be completely solidified until the temperature has been reduced to the neighborhood of —100° F. In a practical sense, however, foods contacted with circulating liquid refrigerants maintained at temperatures between 0° and 10° F., in accordance with the present invention are frozen throughout in a period of a few minutes and may be thereafter preserved by maintaining at a temperature of approximately 0° F. for a long period of time. It is, of course, preferable to store the frozen food in enclosed containers, since even at this temperature there may be slight deterioration due to circulation of an oxygen-containing atmosphere.

The refrigerant liquid should be suitable for use in direct contact with the food which is being frozen. It should have a freezing point of 5° F. or below and should have relatively low viscosities at 0° to 10° F. Aqueous solutions of invert sugar are particularly advantageous for use in the invention. The viscosities and freezing points of invert sugar solutions may be lowered by removing a portion of the dextrose, for example, by crystallizing out some of the dextrose, and the term "invert sugar" is intended to include such solutions containing a greater proportion of levulose than that contained in normal invert sugar. Such solutions may be prepared with freezing points substantially below 0° F. and with viscosities of less than 1000 centipoises at 0° to 10° F. Such solutions of invert sugar may, in general, be used with advantage for the freezing of all types of foods, including fruits, vegetables, and meats. Aqueous solutions of salts, particularly sodium chloride, may also be used, especially for the freezing of vegetables and meats.

The viscosity of the solution at temperatures between 0° and 10° F. is an important factor in the successful operation of the invention. The greater the viscosity, the thicker will be the inert layer of liquid at the interface of the liquid and food through which the heat content of the food must be transferred. Moreover, the internal heat generated in the freezing liquid itself by the work of agitating or circulating it increases very rapidly with increasing viscosity and this fact renders it impossible effectively to compensate for increased viscosity by increasing the rate of circulation. It is therefore desirable that the refrigerant solution used be one which does not exceed 1500 centipoises in viscosity at 5° F.

This invention contemplates the freezing and preservation of foods which have already been prepared in condition for final use. For example strawberries, blackberries, raspberries, youngberries, and similar types of fruits, are graded, stemmed and washed and in suitable condition for direct consumption, immediately prior to the freezing. Fruits, such as peaches, apricots, apples, plums, and the like, are peeled and pitted and prepared in final portions ready for consumption either in halves, or smaller pieces. Meats, such as chops, steaks, fowl, and fish are prepared in cuts of proper shape for final cooking, immediately prior to the freezing. In order to obtain a satisfactory rate of freezing, it is desirable that the units or portions of the foods being frozen have at least one dimension not exceeding about ¾ to 1 inch.

The following examples are illustrative of methods of operation embodying the principles of the invention:

(1) Whole, suitably prepared, fresh strawberries were immersed in an aqueous solution of invert sugar in an insulated chamber. The solution contained 57% by weight of invert sugar and had a freezing point of 0° F. and a viscosity of approximately 400 centipoises at 8° F. The temperature of the solution was maintained at about 5° F. by means of a suitable refrigerating device and the solution was circulating in direct contact with the strawberries at such a rate that the drop in temperature of the solution in passing over the strawberries was less than 1° F. The strawberries were completely frozen in 5 to 6 minutes. The frozen strawberries were then removed from the invert sugar solution, drained or centrifuged, placed in suitable containers and stored at 0° F.

(2) Fresh peas were frozen in an aqueous sodium chloride solution containing about 22% of sodium chloride and having a freezing point of about —5° F., under the same conditions and with the same procedure as in the preceding example. The peas were completely frozen in 2 to 3 minutes.

It will be seen that the invention provides a method by which foods may be frozen at temperatures above the temperature at which they may be safely stored and that by carrying out the freezing by directly contacting the food with a suitable rapidly circulated liquid maintained at a temperature above the optimum temperature and substantially below the freezing temperature of the food, in general, from 0° to 10° F., the food is frozen at such a rapid rate that crystals formed in the freezing process are so small that substantially no deterioration of the food takes place during freezing, in storage, or on thawing. The layer of refrigerant solution coating the frozen food substantially eliminates the action of atmospheric oxygen on the food during storage.

Because of the fact that in the process of the invention the foods are frozen in individual unit operations, the frozen units may be packed for storage in any desired manner for retailing, wholesaling, or storage. For example, they may be packed in one-pound containers or in barrels and in either case the food will be maintained uniform in quality and condition throughout the package. Since the food is in individual frozen units, it may be thawed out for use in any desired amounts without disturbing the remainder of the package.

This application is a continuation-in-part of my application Serial No. 91,442, filed July 18, 1936.

I claim:

1. Process of freezing and preserving a fruit, which comprises maintaining at a temperature of 0° to 10° F. an aqueous invert sugar solution, which has a freezing point not higher than 5° F. and low viscosities at 0° to 10° F., immersing the fruit in a body of said solution, circulating the solution in direct contact with the fruit at such a rate that the fruit is quickly frozen with the formation of only small crystals therein, removing the frozen fruit from the solution, separating substantially all of the solution from the fruit, and storing the frozen fruit in containers maintained at approximately 0° F.

2. Process of freezing a fruit for preservation thereof, which comprises maintaining at a temperature of 0° to 10° F. an aqueous invert sugar solution, which has a freezing point not higher than 5° F., and low viscosities at 0° to 10° F., immersing the fruit in a body of said solution, circulating the solution in direct contact with the fruit at such a rate that the fruit is quickly frozen with the formation of only small crystals therein, removing the frozen fruit from the solution and separating substantially all of the solution from the fruit.

3. Process of freezing and preserving a food, which comprises maintaining at a temperature of 0° to 10° F. an aqueous invert sugar solution, which has a freezing point not higher than 5° F. and low viscosities at 0° to 10° F., immersing the food in a body of said solution, circulating the solution in direct contact with the food at such a rate that the food is quickly frozen with the formation of only smally crystals therein, removing the frozen food from the solution, separating substantially all of the solution from the food, and storing the frozen food in containers maintained at approximately 0° F.

4. Process of freezing a food for preservation thereof, which comprises maintaining at a temperature of 0° to 10° F. an aqueous invert sugar solution, which has a freezing point not higher than 5° F. and low viscosities at 0° to 10° F., immersing the food in a body of said solution, circulating the solution in direct contact with the food at such a rate that the food is quickly frozen with the formation of only small crystals therein, removing the food from the solution when frozen and separating substantially all of the solution from the food.

5. Process of freezing and preserving a fruit, which comprises maintaining at a temperature of 0° to 10° F. an aqueous invert sugar solution, which has a freezing point not higher than 5° F. and low viscosities at 0° to 10° F., immersing the fruit which has been prepared for freezing in units having at least one dimension which does not exceed about 1 inch in a body of said solution, circulating the solution in direct contact with the fruit at such a rate that the fruit is frozen in a period of time of the order of five minutes, removing the frozen fruit from the solution, separating substantially all of the solution from the fruit, and storing the frozen fruit in containers maintained at approximately 0° F.

6. Process of freezing a fruit for preservation thereof, which comprises maintaining at a temperature of 0° to 10° F. an aqueous invert sugar solution, which has a freezing point not higher than 5° F. and low viscosities at 0° to 10° F., immersing the fruit which has been prepared for freezing in units having at least one dimension which does not exceed about 1 inch in a body of said solution, circulating the solution in direct contact with the fruit at such a rate that the fruit is frozen in a period of time of the order of five minutes, removing the frozen fruit from the solution, and separating substantially all of the solution from the fruit.

7. Process of freezing and preserving a food, which comprises maintaining at a temperature of 0° to 10° F. an aqueous invert sugar solution, which has a freezing point not higher than 5° F. and low viscosities at 0° to 10° F., immersing the food which has been prepared for freezing in units having at least one dimension which does not exceed about 1 inch in a body of said solution, circulating the solution in direct contact with the food at such a rate that the feed is frozen in a period of time of the order of five minutes, removing the frozen food from the solution, separating substantially all of the solution from the food, and storing the frozen food in containers maintained at approximately 0° F.

8. Process of freezing a food for preservation thereof, which comprises maintaining at a temperature of 0° to 10° F. an aqueous invert sugar solution, which has a freezing point not higher than 5° F. and low viscosities at 0° to 10° F., immersing the food which has been prepared for freezing in units having at least one dimension which does not exceed about 1 inch in a body of said solution, circulating the solution in direct contact with the food at such a rate that the food is frozen in a period of time of the order of five minutes, removing the food from the solution when frozen, and separating substantially all of the solution from the food.

9. Process of freezing a food for preservation thereof, which comprises directly contacting the food with an aqueous invert sugar solution, which has a freezing point not higher than 5° F. and low viscosities at 0° to 10° F., maintaining the temperature of said solution between the temperature at which the food may be safely stored and a temperature substantially below the freezing point of the food, and circulating the solution over the food at such a rate that the temperature of the solution adjacent the food remains below the freezing point of the food.

10. Process of freezing a food for preservation thereof, which comprises directly contacting the food in the form of units having at least one dimension which does not exceed about 1 inch, with an aqueous solution which has a freezing point not higher than 5° F., and low viscosities at 0° to 10° F. and which is suitable for use in direct contact with the food, maintaining the temperature of said solution between the temperature at which the food may be safely stored and a temperature substantially below the freezing point of the food and circulating the solution over the food at such a rate that the temperature of the solution adjacent the food remains below the freezing point of the food, the food not being cooled during the freezing operation below the temperature at which the food may be safely stored.

11. Process of freezing a food for preservation thereof, which comprises directly contacting the food in the form of units having at least one dimension which does not exceed about 1 inch, with an aqueous solution which has a freezing point not higher than 5° F. and low viscosities at 0° to 10° F. and which is suitable for use in direct contact with the food, maintaining the temperature of said solution between 0° and 10° F., and circulating the solution over the food at such a rate that the temperature of the solution adjacent the food remains below the freezing point of the food, the food not being cooled below 0° F. during the freezing operation.

12. Process of freezing a food for preservation thereof, which comprises maintaining at a temperature of 0° to 10° F. an aqueous solution, which has a freezing point not higher than 5° F. and low viscosities at 0° to 10° F. and which is suitable for use in direct contact with the food, immersing the food, which has been prepared for freezing in units of the size in which it is subsequently to be consumed or cooked and consumed, in a body of said solution, and circulating the solution in direct contact with the food at such a rate that the food is frozen with the formation of only small crystals within the food, the food not being cooled below 0° F. during the freezing operation.

13. Process of freezing a food of the class consisting of fruits and vegetables for preservation thereof, which comprises directly contacting the food in the form of units having at least one dimension which does not exceed about 1 inch, with an aqueous solution which has a freezing point not higher than 5° F. and low viscosities at 0° to 10° F. and which is suitable for use in direct contact with the food, maintaining the temperature of said solution between the temperature at which the food may be safely stored and a temperature substantially below the freezing point of the food and circulating the solution over the food at such a rate that the temperature of the solution adjacent the food remains below the freezing point of the food, the food not being cooled during the freezing operation below the temperature at which the food may be safely stored.

14. Process of freezing a food of the class consisting of fruits and vegetables for preservation thereof, which comprises directly contacting the food in the form of units having a least one dimension which does not exceed about 1 inch, with an aqueous solution which has a freezing point not higher than 5° F. and low viscosities at 0° to 10° F. and which is suitable for use in direct contact with the food, maintaining the temperature of said solution between 0° and 10° F., and circulating the solution over the food at such a rate that the temperature of the solution adjacent the food remains below the freezing point of the food, the food not being cooled below 0° F. during the freezing operation.

ROBERT B. TAYLOR.

CERTIFICATE OF CORRECTION.

Patent No. 2,164,362. July 4, 1939.

ROBERT B. TAYLOR.

It is hereby certified that error appears in the printed specification of the above numbered patent requiring correction as follows: Page 2, second column, line 52, claim 3, for "smally" read small; page 3, first column, line 32, claim 7, for the word "feed" read food; same page, second column, line 59, claim 14, for "a" read at; and that the said Letters Patent should be read with this correction therein that the same may conform to the record of the case in the Patent Office.

Signed and sealed this 22nd day of August, A. D. 1939.

Leslie Frazer (Seal) Acting Commissioner of Patents.